United States Patent [19]

Renner et al.

[11] Patent Number: 4,713,417

[45] Date of Patent: Dec. 15, 1987

[54] POLYMERS FORMED FROM ALLYL-SUBSTITUTED OR METHALLYL-SUBSTITUTED, BICYCLIC, UNSATURATED DICARBOXYLIC ANHYDRIDES

[75] Inventors: Alfred Renner, Muntelier; Theobald Haug, Frenkendorf; Bruno Schreiber, Aesch, all of Switzerland

[73] Assignee: Ciba-Geigy Corp., Ardsley, N.Y.

[21] Appl. No.: 4,251

[22] Filed: Jan. 5, 1987

Related U.S. Application Data

[63] Continuation of Ser. No. 694,582, Jan. 24, 1985, abandoned.

[30] Foreign Application Priority Data

Jan. 31, 1984 [CH] Switzerland .......................... 448/84

[51] Int. Cl.$^4$ ...................... C08F 124/00; C08L 63/02
[52] U.S. Cl. ...................... 525/117; 525/530
[58] Field of Search ........................ 525/117

[56] References Cited

U.S. PATENT DOCUMENTS 3,105,839 10/1963 Renner .............................. 528/112
3,287,395 11/1966 Chang .............................. 528/298
3,453,293 7/1969 Pita .............................. 549/237
3,995,099 11/1976 Gaylord .
4,012,575 3/1977 Gaylord .
4,168,359 9/1979 Gaylord .
4,202,955 5/1980 Gaylord .

Primary Examiner—Lewis T. Jacobs
Assistant Examiner—Robert E. L. Sellers, II
Attorney, Agent, or Firm—Harry Falber

[57] ABSTRACT

Polymers formed from anhydrides of the formula I

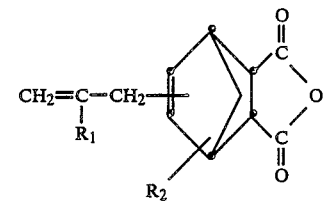

(I)

in which $R_1$ and $R_2$ independently of one another are hydrogen or methyl.

The novel polymers are suitable for use as curing agents for polyepoxide compounds.

6 Claims, No Drawings

POLYMERS FORMED FROM ALLYL-SUBSTITUTED OR METHALLYL-SUBSTITUTED, BICYCLIC, UNSATURATED DICARBOXYLIC ANHYDRIDES

This application is a continuation of application Ser. No. 694,582 filed 1-24-85, now abandoned.

The present invention relates to polymers formed from allyl-substituted or methallyl-substituted bicyclo[2.2.1]-hept-5-ene-2,3-dicarboxylic anhydrides, to a process for their preparation and to their use as curing agents for polyepoxide compounds having on average more than one epoxide group in the molecule.

Polymers formed from bicyclic dicarboxylic anhydrides are known. Thus, for example, German Offenlegungsschrift 2,521,152 describes polymers formed from unsubstituted cis-5-norbornene-2,3-dicarboxylic anhydride, in other words from unsubstituted cis-bicyclo[2.2.1]hept-5-ene-2,3-dicarboxylic anhydride. A process for the preparation of these polymers by thermal polymerisation of the anhydride in the presence of a free-radical former is also disclosed.

Novel polymers formed from allyl-substituted or methallyl-substituted bicyclo[2.2.1]hept-5-ene-2,3-dicarboxylic anhydrides and which have valuable physical properties have now been found. Surprisingly, the polymerisation of the anhydride, in which both the allyl or methallyl double bond and the ring double bond participate, does not result in crosslinked, and hence infusible and insoluble or sparingly soluble, products, but result in fusible and soluble polymers having, in some cases, high softening points.

The present invention relates, therefore, to polymers formed from anhydrides of the formula I

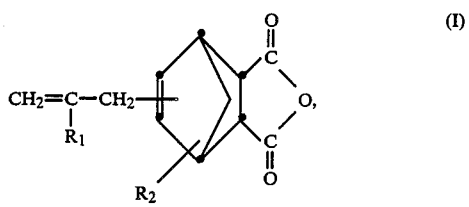

in which $R_1$ and $R_2$ independently of one another are hydrogen or methyl.

$R_1$ in the formula I is preferably hydrogen. Polymers formed from anhydrides of the formula I, in particular from an anhydride of the formula I in which both $R_1$ and $R_2$ are hydrogen, are particularly preferred.

The polymers according to the invention are to be understood as meaning dimeric, oligomeric and higher-molecular products formed from the anhydrides of the formula I. They preferably have a degree of polymerisation of 2-100, especially 2-20 and particularly 2-6. Preferred polymers according to the invention are homopolymers formed from an anhydride of the formula I.

The position of the two substituents $-CH_2-C(R_1)=CH_2$ and $R_2$=methyl cannot be established unambiguously. It is assumed that they are in one of the positions 1, 4, 5 or 6 of the bicycloheptene ring. It is not possible to establish these positions unambiguously, however, because the chemical structure of the corresponding anhydrides of the formula I has not as yet been completely clarified.

The polymers according to the invention can be obtained by heating one or more anhydrides of the formula I at a temperature between 150° C. and 350° C. The polymerisation can take 1 to 30 hours.

In contrast with the polymerisation process described in German Offenlegungsschrift 2,521,152 for the preparation of polymeric cis-5-norbornene-2,3-dicarboxylic anhydride, free-radical formers, such as organic peroxides, do not accelerate the present polymerisation. Surprisingly, however, the polymers according to the invention can be prepared merely by heating in the absence of a free-radical former. Unexpectedly, the polymerisation can also be carried out in the presence of at least one catalyst suitable for cationic polymerisation.

Examples of suitable catalysts are Bronsted oxo-acids, esters and halide derivatives thereof and Lewis acids. Suitable oxo-acids are both mineral acids, for example $H_2SO_4$, $H_3PO_3$ and $H_3PO_4$, and organic acids, for example methanesulfonic acid, benzenesulfonic acid, p-toluenesulfonic acid, naphthalene-2-sulfonic acid or phenylphosphonic acid.

Examples of suitable ester derivatives of oxo-acids are triphenyl phosphite or 1,4-butanediol bis-p-toluenesulfonate.

Suitable acid halides are, in particular, the chlorides of the oxo-acids mentioned.

Examples of suitable Lewis acids are halides of elements of group II, III, IV or V of the periodic system. For example, $FeCl_3$, $ZnCl_2$, $BCl_3$, $BF_3$, $AlCl_3$, $TiCl_4$, $SnCl_4$ or $SbCl_5$ are particularly suitable.

The catalysts can be employed in amounts from 0.1 to 5% by weight, preferably 0.5 to 2% by weight, based on the reaction mixture.

The polymers according to the invention can preferably be obtained by carrying out the polymerisation in the absence of a catalyst.

It is preferable to heat an anhydride of the formula I at a temperature from 180° to 230° C., in particular for 12 to 24 hours.

The polymerisation is advantageously effected in the absence of a solvent. It can, however, also be carried out in the presence of any desired organic solvent which is inert towards the anhydride function, ie. contains no active hydrogen. Examples of suitable solvents are high-boiling aliphatic, aromatic and araliphatic hydrocarbons, for example xylene, toluene, tetralin or isododecane.

The anhydrides of the formula I can be prepared in accordance with the process described in U.S. Pat. No. 3,105,839 by reacting sodium cyclopentadienide of the formula II

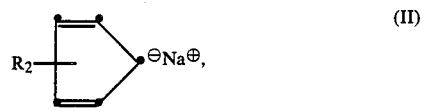

in which $R_2$ is as defined in formula I, with an allyl or methallyl halide and then forming a Diels-Alder adduct of the formula I with maleic anhydride.

Although it is stated in the said U.S. patent that the allyl group is attached in the 7-position of the bicycloheptene, recent investigations show that an isomeric mixture is formed in respect of the position of the allyl group and also in respect of the endo-configuration and exo-configuration of the anhydride moiety:

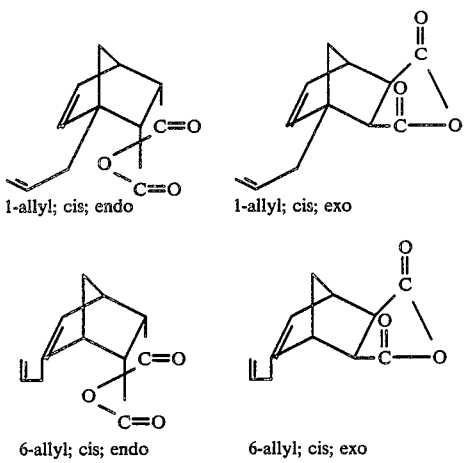

1-allyl; cis; endo    1-allyl; cis; exo 6-allyl; cis; endo    6-allyl; cis; exo

The following structural units in the polymers according to the invention are considered probable on the basis of the NMR and IR spectra and the glass transition temperatures:

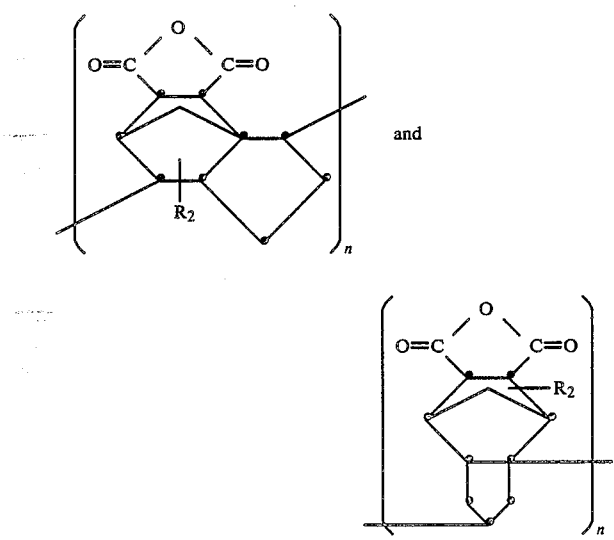

in which n is preferably 2–100 and especially 2–6.

The polymers according to the invention are distinguished by good solubility in organic solvents, for example in ketones and esters, by good miscibility with epoxide resins and by high glass transition temperatures. The polymers according to the invention are solid resins the softening points of which can be adjusted to suit the particular application by varying the degree of polymerisation. The variation of the degree of polymerisation is preferably effected by altering the reaction time and/or the reaction temperature. Preferred polymers are those having softening points between 80° C. and 250° C., in particular 100° C. and 200° C.

The polymers according to the invention are excellently suitable for use as curing agents for epoxide resins. The present invention also relates, therefore, to curable mixtures containing a polymer of the anhydride of the formula I and a polyepoxide compound having on average more than one epoxide group in the molecule.

Polyepoxide compounds suitable for the curable mixtures according to the invention are those having on average more than one glycidyl group or $\beta$-methylglycidyl group attached to a hetero-atom, preferably oxygen or nitrogen, or those having on average more than one epoxycyclohexyl grouping. (a) diglycidyl and polyglycidyl ethers of polyhydric aliphatic alcohols, such as 1,4-butanediol or neopentyl glycol, or of polyalkylene glycols, such as polypropylene glycols, (b) diglycidyl or polyglycidyl ethers of cycloaliphatic polyols, such as 2,2-bis-(4-hydroxycyclohexyl)-propane or 1,4-bis-(hydroxymethyl)-cyclohexane, (c) diglycidyl or polyglycidyl ethers of polyhydric phenols, such as resorcinol, bis-(p-hydroxyphenyl)-methane (bisphenol F), 2,2-bis-(p-hydroxyphenyl)-propane (bisphenol A), 2,2-bis(4'-hydroxy-3',5'-dibromophenyl)-propane (tetrabromobisphenol A) or 1,1,2,2-tetrakis-(p-hydroxyphenyl)-ethane, or of condensation products, obtained under acid conditions, of phenol or alkylphenols having up to 9 C atoms in the alkyl group with formaldehyde, such as phenol novolaks and cresol novolaks, (d) di-($\beta$-methylglycidyl) or poly-($\beta$-methylglycidyl) ethers of the polyhydric alcohols or polyhydric phenols listed above, (e) compounds containing epoxycyclohexyl groupings, such as 3',4'-epoxycyclohexylmethyl 3,4-epoxycyclohexylcarboxylate, 3-(3',4'-epoxycyclohexyl)-2,4-dioxaspiro[5,5]8,9-epoxyundecane and bis-(3,4-epoxycyclohexylmethyl) adipate, (f) diglycidyl and/or polyglycidyl esters of polybasic carboxylic acids, such as phthalic acid, terephthalic acid, $\Delta$4-tetrahydrophthalic acid, hexahydrophthalic acid, trimellitic acid, oxalic acid, malonic acid, adipic acid, succinic acid, fumaric acid and maleic acid, and (g) N-glycidyl derivatives of amines, amides and heterocyclic nitrogen bases, such as N,N-diglycidylaniline, N,N-diglycidyltoluidine and N,N,N',N'-tetraglycidyl-bis-(p-aminophenyl)methane; triglycidyl compounds of p-hydroxyaniline; triglycidyl isocyanurate; N,N'-diglycidylethyleneurea; N,N'-diglycidyl-5,5-dimethylhydantoin and N,N'-diglycidyl-5-isopropylhydantoin; and N,N'-diglycidyl-5,5-dimethyl-6-isopropyl-5,6-dihydrouracil.

It is particularly preferable to employ, in the mixtures according to the invention, diglycidyl ethers, which can be so-called advanced, of dihydric phenols, in particular 2,2-bis-(4-hydroxyphenyl)-propane, 2,2-bis-(3,5-dibromo-4- hydroxyphenyl)-propane, bis-(4-hydroxyphenyl)-methane, bis(4-hydroxycyclohexyl)-methane and 2,2-bis-(4-hydroxycyclohexyl)-propane, polyglycidyl ethers of novolaks or tetraglycidylated 4,4'-diaminodiphenylmethane. Compounds which are very particularly preferred are diglycidyl ethers, which can be so-called advanced, of bisphenol A, tetrabromobisphenol A or bisphenol F, tetraglycidylated 4,4'-diaminodiphenylmethane, polyglycidyl ethers of phenol-formaldehyde or cresol-formaldehyde novolaks, or mixtures thereof.

It is also possible to employ mixtures of the diepoxides and polyepoxides mentioned.

It is also possible to add customary modifying agents, such as extenders, fillers and reinforcing agents, pigments, dyes, organic solvents, plasticisers, flow control agents, thixotropic agents, flame-retarding substances or mould release agents, to the curable mixtures according to the invention before curing, in any phase.

The following may be mentioned as examples of extenders, reinforcing agents, fillers and pigments which can be employed in the curable mixtures according to the invention: coal tar, bitumen, liquid coumarone/indene resins, textile fibres, glass fibres, asbestos fibres, boron fibres, carbon fibres, cellulose, polyethylene powder, polypropylene powder, quartz powder, mineral silicates, such as mica, ground asbestos, ground shale, kaolin, aluminium oxide trihydrate, powdered chalk, gypsum, Bentone, silica aerogel, lithopone, baryte, titanium dioxide, carbon black, graphite, oxide colourants, such as iron oxide, or metal powders, such as aluminium powder or iron powder. Antimony trioxide is an example of a suitable flame-retarding agent.

Examples of suitable organic solvents for the modification of the curable mixtures are toluene, xylene, butyl acetate, acetone and methyl ethyl ketone.

Examples of plasticisers which can be employed for the modification of the curable mixtures are dibutyl, dioctyl and dinonyl phthalate, tricresyl phosphate, trixylenyl phosphate and diphenoxyethyl formate.

Examples of flow control agents which can be added when the curable mixtures are employed specifically in surface protection are silicones, liquid acrylic resins, cellulose acetobutyrate, polyvinylbutyral, waxes, stearates etc. (these are in part also used as mould release agents).

The curing of the curable mixtures according to the invention to give shaped articles and the like is preferably carried out within the temperature range between 80° and 250° C., preferably between 170° C. and 220° C. The curing can also be carried out in two or more stages in a known manner, the first curing stage being carried out at a low temperature and the post-curing at a higher temperature.

If the gelling or curing times are to be shortened, it is possible to add known curing catalysts. Examples of suitable catalysts are tertiary amines, such as triethylamine or benzyldimethylamine, pyridine and substituted pyridine derivatives, for example 4-dimethylaminopyridine or N-p-chlorophenyl-N',N'-dimethylurea ("Monuron").

The catalysts can be employed in amounts of 0.1 to 5% by weight, preferably 0.1 to 2% by weight, based on the reaction mixture.

The preparation of the curable mixtures according to the invention can be effected in a customary manner by means of known mixing units (stirrers, kneaders or rolls or, in the case of solid substances or powders, in mills or dry mixers). In some cases it is necessary to warm the mixture briefly in order to achieve adequate homogeneity.

The curable mixtures according to the invention are employed particularly in the fields of surface protection, electrical engineering, laminating processes, adhesives technology and building. They can be used in a formulation adjusted to suit each particular end use, in an unfilled or filled state, if desired in the form of solutions or emulsions, as compression moulding compositions, adhesives, laminating resins and matrix resins for "composites".

PREPARATION EXAMPLES

EXAMPLE 1

Polymerisation of allyl-bicyclo[2.2.1]hept-5-ene-2,3-dicarboxylic anhydride of the formula

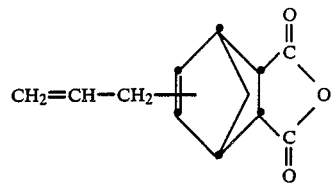

250 parts of the anhydride are heated to 200° C., with stirring and while nitrogen is passed in. A further 750 parts of anhydride are added dropwise at such a rate that the temperature does not exceed 200° C. A brown solid resin having the following properties is obtained after 10 hours:
Softening point (SP): 90° C.
Anhydride content: 3.79 equivalents/kg
Acid content: 0.025 equivalents/kg
Number average molecular weight ($\overline{M}_n$): 463
Weight average molecular weight ($\overline{M}_w$): 1419

EXAMPLES 2-5:

The same anhydride as in Example 1 is polymerised and the procedure of this example is repeated, except that the polymerisation time is varied.

The properties of the polymers as a function of the polymerisation time at 200° C. are shown in Table 1 below.

TABLE 1

| Example No. | Polymerisation time (hours) | Anhydride content (eq./kg) | Acid content (eq./kg) | SP (°C.) | $\overline{M}_n$ | $\overline{M}_w$ |
|---|---|---|---|---|---|---|
| 2 | 13 | 3.99 | 0.028 | 120 | 463 | 1420 |
| 3 | 16 | 3.89 | 0.026 | 158 | 518 | 1657 |
| 4 | 18 | 3.84 | 0.030 | 170 | 641 | 2133 |
| 5 | 24 | 3.79 | 0.038 | 200 | 778 | 3118 |

EXAMPLE 6

Polymerisation of allylbicyclo[2.2.1]hept-5-ene-2,3-dicarboxylic anhydride of the formula 200 parts of the anhydride are heated to 240° C., with stirring and while nitrogen is passed in. An exothermic reaction then sets in and the temperature rises to 300° C. The reaction mixture is cooled to 240° C. and is kept at this temperature for 1 hour.

A dark brown solid resin having the following properties is obtained:
Softening point (SP): 238° C.
Anhydride content: 3.28 equivalents/kg
Acid content: 0.50 equivalents/kg
$\overline{M}_n$: 1130
$\overline{M}_w$: 5244

Neither the cyclic nor the allylic double bond (which correspond to peaks of 1620 cm$^{-1}$ and 1640 cm$^{-1}$, respectively) can be detected in the IR spectrum.

EXAMPLE 7

Preparation of a copolymer in the presence of a catalyst.

10.1 g of allylbicyclo[2.2.1]hept-5-ene-2,3-dicarboxylic anhydride, 11.6 g of methallylmethylbicyclo[2.2.1]-hept-5-ene-2,3-dicarboxylic anhydride of the formula

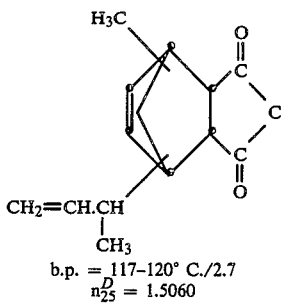

b.p. = 117-120° C./2.7
$n_D^{25}$ = 1.5060 and 0.217 g of p-toluenesulfonic acid monohydrate are heated at 180° C. for 24 hours in an atmosphere of nitrogen, with stirring. A brown solid resin having the following properties is obtained in a quantitative yield:
Softening point (SP): 80.5° C.
Anhydride content: 4.15 equivalents/kg
Acid content: 0.23 equivalents/kg
$\overline{M}_n$: 501
$\overline{M}_w$: 718

USE EXAMPLES

Epoxy compression moulding compositions are prepared using the polymer, according to the invention, from Example 3.

EXAMPLE A 11 parts by weight of the polymer according to the invention are weighed into a ball mill together with 74.5 parts by weight of powdered quartz, and the mixture is ground for 10 hours. 12.8 parts by weight of epoxidised cresol novolak (epoxide content: 4.3 equivalents/kg), 1.1 parts by weight of zinc stearate, 0.1 part by weight of iron (III) acetylacetonate and 0.5 part by weight of gas carbon black are then added to the polymer, and the mixture is ground for a further 15 hours. Finally, the composition is fused in a twin-screw extruder at a jacket temperature of 100° C. and, after cooling, is ground.

The moulding compositions are cured by customary processes in steel moulds heated at 170° C. and are processed to give test specimens having the following properties:
Shrinkage in the mould: 0.5% (% of length)
Flexural strength (ISO* 178): 100 N/mm$^2$
Dissipation factor tgδ/50 Hz: 0.026 ε/50 Hz: 4.9
(DIN** 53,483)
* ISO=International Standardizing Organisation
** DIN=Deutsches Institute für Normung e.V. (German Standards Institute)

EXAMPLE B 6 parts by weight of the polymer according to the invention are ground for 10 hours in a dry mixer, together with 40 parts by weight of quartz powder. 34.9 parts by weight of short glass fibres, 17.8 parts by weight of epoxide resin based on bisphenol A, i.e. 2,2-bis-(p-hydroxyphenyl)propane, having an epoxide content of 1.7 equivalents/kg, 0.6 part by weight of Hoechst OP-Wachs ® as a mould release agent, 0.5 part by weight of a dye and 0.2 part by weight of 2-ethylimidazole are then added to the mixture. The resulting mixture is homogenised for 120 seconds in a high-speed mixer and is then kneaded at 90° C. in a two-roll calender and rolled out. The resulting flat sheet is ground, and the ground material is processed as described in Example A to give test specimens.

The epoxy compression moulding composition prepared in this way has the following properties:
Shrinkage in the mould: 0.5%
Flexural strength (ISO 178): 130 N/mm$^2$
Heat distortion point (ISO 75): 190° C.
Dissipation factor tgδ/50 Hz: 0.02 ε50 Hz: 4.8
(DIN 53,483)

EXAMPLE C 11.9 parts by weight of the polymer according to the invention, 11.9 parts by weight of triglycidyl isocyanurate, 74.5 parts by weight of wollastonite, 0.2 part by weight of imidazole, 1.0 part by weight of Hoechst OP-Wachs ® as a mould release agent and 0.5 parts by weight of a dye are ground for 40 hours in a dry mixer. The product is tabletted, the tablets are comminuted and granules having a particle size of 0.2-4.0 mm are obtained by screening. After the granules have been processed to give mouldings, the following properties are determined on the test speci- mens:
Shrinkage in the mould: 0.3%
Flexural strength (ISO 178): 110 N/mm$^2$
Heat distortion point (ISO 75): 170° C.
Tracking resistance
(DIN 53,480; method K8): >600 volts.

In Examples D-H which follow, laminates are prepared using the polymer, according to the invention, from Example 3 and the following epoxide resins:
Epoxide resin I: liquid epoxide resin based on bisphenol A diglycidyl ether (epoxide content: 5.20-5.35 equivalents/kg)
Epoxide resin II: epoxide resin based on tetrabromobisphenol A diglycidyl ether (epoxide content: 2.4-3.1 equivalents/kg)
Epoxide resin III: epoxide resin based on tetrabromobisphenol A diglycidyl ether (epoxide content: 2.0-2.2 equivalents/kg)
Epoxide resin IV : N,N,N',N'-tetraglycidyl-4,4'-diaminodiphenylmethane (epoxide content: approx. 8 equivalents/kg)
Epoxide resin V: solid epoxide resin based on bisphenol A diglycidyl ether (epoxide content: 1.90-2.0 equivalents/kg)
Epoxide resin VI: an epoxidised phenol novolak (epoxide content: 5.5-5.8 equivalents/kg)

The properties of the laminates prepared are summarised in Table 2.

EXAMPLE D

A solution consisting of 73 g of epoxide resin I, 162 g of epoxide resin II, 129 g of epoxide resin III and 240 g of methyl ethyl ketone is prepared. 191 g of the polymer according to the invention and 1.0 g of benzyldimethylamine are added to this solution. The resulting solution is used to impregnate a glass fabric, which is then dried at 140° C. A so-called prepreg is formed. Assemblies of 8 layers of this prepreg are compressed for 2 hours at 200° C. and a pressure of 30×10$^4$ Pa, as a result of which a laminate sheet is formed.

EXAMPLE E

A solution consisting of 116 g of epoxide resin I, 74.8 g of epoxide resin II, 78 g of epoxide resin IV and 260 g of methyl ethyl ketone is prepared. 347 g of the polymer according to the invention are added to this solution and dissolved. The resulting solution is used to prepare a laminate as described in Example D.

EXAMPLE F

A solution consisting of 100 g of epoxide resin I, 100 g of epoxide resin II, 190 g of epoxide resin V and 350 g of methyl ethyl ketone is prepared. 212 g of the polymer according to the invention and 0.4 g of benzyldimethylamine are dissolved in this solution. The resulting solution is used to prepare a laminate according to Example D.

EXAMPLE G

A solution consisting of 121 g of epoxide resin I, 120.6 g epoxide resin II, 134.4 g of epoxide resin V and 400 g of methyl ethyl ketone is prepared. 224.4 g of the polymer according to the invention and 0.4 g of benzyldimethylamine are dissolved in this solution. The resulting solution is used to prepare a laminate analogously to Example D, but with the difference that the impregnated glass fabric is dried at 150° C.

EXAMPLE H

A solution consisting of 185 g of epoxide resin I, 144.8 g of epoxide resin II, 109.8 g of epoxide resin VI and 530 g of methyl ethyl ketone is prepared. 355 g of the polymer according to the invention and 0.6 g of benzyldimethylamine are dissolved in this solution. The resulting solution is used to prepare a laminate analogously to Example D, but with the difference that the impregnated glass fabric is dried at 160° C.

TABLE 2

| Properties of the laminates | Use examples | | | | |
|---|---|---|---|---|---|
| | D | E | F | G | H |
| Glass transition temperature determined by means of DTA* (°C.) | 179 | 182 | 180 | 180 | 180 |
| Absorption of boiling water after 4 hours in $H_2O$ at 100° C. (% by weight) | 0.17 | 0.47 | 0.27 | 0.25 | 0.37 |
| Interlaminar shear strength as specified in ASTM D 2344 ($N/mm^2$) | 47 | 31 | 42 | 38 | — |
| Flammability as specified in UL 94** | V-O | V-O | V-O | V-O | V-O |

*DTA: differential thermoanalysis
**UL 94: Determination of the flammability of plastics by the process of the Underwriters' Laboratories (U.S.A.). V-O corresponds to the following behaviour after removal from a flame: the test specimen does not burn for more than 10 seconds. The average burning time of 5 test specimens does not exceed 5 seconds. The test specimen does not drip while burning.

What is claimed is:

1. A curable mixture containing a polymer obtained by the polymerization solely of a monomer or a mixture of monomers of the formula I

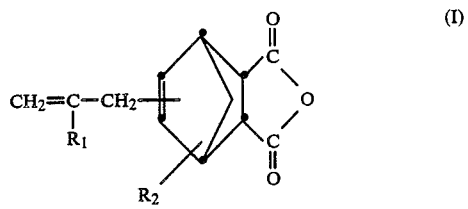

in which $R_1$ and $R_2$ independently of one another are hydrogen or methyl; and a separately added polyepoxide compound containing on average more than one epoxide group in the molecule.

2. A mixture according to claim 1, wherein the polymer is a homopolymer formed from a monomer of the formula I.

3. A mixture according to claim 1, in which $R_1$ in the formula I is hydrogen.

4. A mixture according to claim 1, in which $R_1$ and $R_2$ in formula I are hydrogen.

5. A mixture according to claim 2, in which $R_1$ and $R_2$ in formula I are hydrogen.

6. The product obtained after curing, when using the mixture according to claim 1.

* * * * *